C. UNGERMAN.
FLOATING CHUCK.
APPLICATION FILED FEB. 5, 1919.
1,356,571.
Patented Oct. 26, 1920.
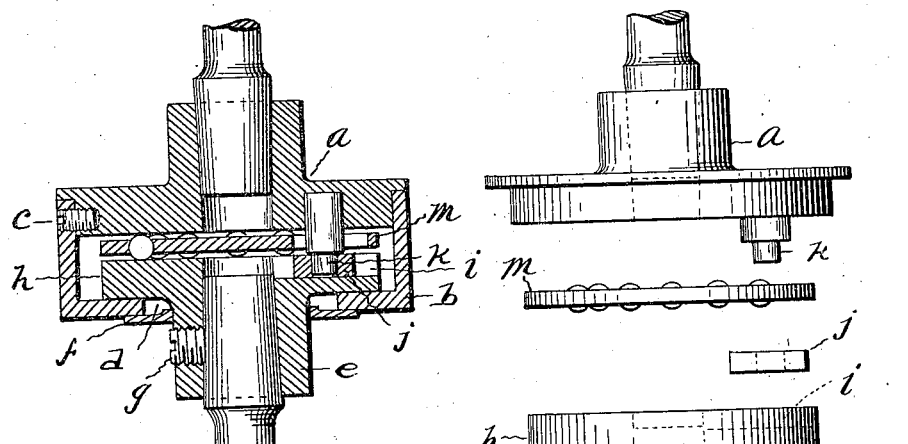
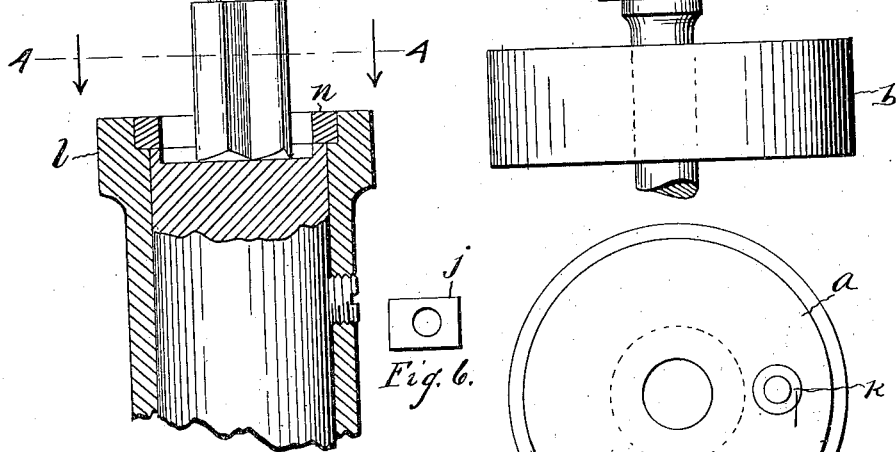
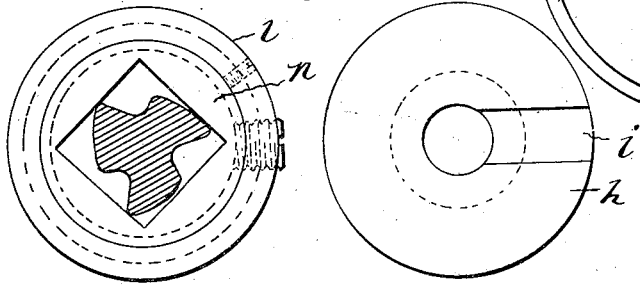
INVENTOR
Carl Ungerman
BY Stuart C. Barnes
ATTORNEY.

UNITED STATES PATENT OFFICE.

CARL UNGERMAN, OF DETROIT, MICHIGAN, ASSIGNOR TO AMERICAN METAL PRODUCTS CORP., OF DETROIT, MICHIGAN, A CORPORATION OF MICHIGAN.

FLOATING CHUCK.

1,356,571.  Specification of Letters Patent.  Patented Oct. 26, 1920.

Application filed February 5, 1919. Serial No. 275,085.

*To all whom it may concern:*

Be it known that I, CARL UNGERMAN, a citizen of Bohemia, residing at Detroit, county of Wayne, State of Michigan, have invented a new and useful Improvement in Floating Chucks, of which the following is a specification.

This invention relates to floating chucks, and has for its object a tool-holding member which has a radially sliding pivot with respect to the member which is fastened to the machine.

These floating chucks are used primarily for allowing freedom of movement for an end miller to follow a jig to cut a polygonal hole. End milling cutters and jigs for this purpose are old in the art. The improvement resides in the improved form of chuck.

In the drawings,—

Figure 1 is a longitudinal section of the floating chuck showing the tool in relation to the jig and work.

Fig. 2 is an elevation showing how the parts of the chuck assemble.

Fig. 3 is an inside plan view of the head $a$, which is the part fastened to the machine.

Fig. 4 is a section on the line 4—4 of Fig. 1.

Fig. 5 is a plan view of the tool-shank holder or member $e$ of Fig. 2.

Fig. 6 is a detail of the radial slide $j$ of Fig. 2.

The end milling cutter fits into a jig $n$ fastened in the jig sleeve $l$ that can be attached to the work by a set screw. The jig $n$ has a polygonal hole of precisely the shape that is desired to be made in the work. Preferably the work is first bored with a hole of circular cross section, although this is not necessary. The milling cutter always has one less flute and cutting edge than the polygon that is desired to be milled out. The greatest breadth of the cutter through its center is only slightly less than the minimum breadth of the polygon through the center. Consequently the fluted cutter will follow the pattern of the jig accurately provided the tool-shank holder is permitted universal movement within a given plane while tied to the head that connects with the machine so that it either rotates with that member or is held from rotation by that member while the work rotates. This is well understood in the art and needs no more elaborate description. Chucks to allow tools this universal movement in one plane have already been designed, but so far as I am aware they operate on the principle, familiar in machine tools, of a carriage and a cross carriage both of which are slidable in paths at right angles to each other.

My improvement resides in a chuck that adopts what I believe to be a different method of getting the universal movability in a given plane, namely, by a slide and pivot in place of two slides. $e$ is the tool-shank holder in the form of a sleeve with an annular flange $h$ radially slotted at $i$ to receive the small slide $j$ that fits rotatably upon the pin $k$ which is driven into the head $a$ (the member immediately connected to the machine). $m$ is a disk perforated for antifriction balls, held in place by swaging the stock of the disk over the ball. $f$ is a ring to fit over the sleeve $e$ and cover up the hole $d$ of the housing $b$, which is larger than the diameter of the sleeve to permit this wabbling action.

Obviously, the slide $j$ operating in the groove $i$ and the pin $k$, upon which it pivots, being eccentric, the tool-holding shank and the member $a$ are tied together so they will rotate together or when one is held from rotation the other will be held from rotation. The slide being movable radially freely with respect to the tool-shank holder and being pivoted to the pin $k$, obviously the tool-shank holder has a lateral swinging or pivotal motion with respect to the member on an arc crossing the line of travel of the slide $j$. The result of this double movement is universal movement within a given plane and given limits of that plane.

The chuck and work may be used on various forms of machine tools; for instance, it may be applied to a lathe. When applied to a lathe preferably the member $a$ is placed in the tail stock and held from rotation. The work is placed in the head stock and rotated. In some machines and in a lathe the chuck itself may be rotated and the work with the jig held stationary.

Obviously the slide could slide in a groove of the head and the pin be driven into the tool-shank holder. Hence such a simple reversal of parts is contemplated as within the spirit of the claim although it defines the elements descriptively as shown in the drawings.

What I claim is:

A floating chuck for drilling square holes, having in combination, a head provided with an extended hollow portion for receiving a driving arbor, a tool shank holder comprising an extended hollow neck portion to which the tool may be secured, the tool shank holder being provided with a radial guiding recess in its upper surface, a disk provided with anti-friction balls interposed between the driving head and the tool shank holder, a pin secured to the driving head, a slide fitted to slide in the recess in the tool shank holder and having a pivotal fitting in the said pin, and a housing having a flanged portion fitting under the tool shank holder and having a barrel portion engaging and removably secured to the driving head for assembling the tool shank holder and the anti-friction disk thereto, and a jig for engaging the tool provided with a polygonal opening therein for guiding the tool.

In witness whereof I have hereunto set my hand on the 29th day of January, 1919.

CARL UNGERMAN.